United States Patent [19]
Manalio

[11] Patent Number: 5,979,222
[45] Date of Patent: Nov. 9, 1999

[54] PRESSURE VESSEL ADAPTOR FOR TESTING OF UNDERSEA FIBER OPTIC SYSTEMS

[75] Inventor: Anthony A. Manalio, Bridgewater, N.J.

[73] Assignee: Tyco Submarine Systems, Ltd., Eatontown, N.J.

[21] Appl. No.: 09/174,104

[22] Filed: Oct. 16, 1998

[51] Int. Cl.$^6$ .............................. G01M 3/02; G01M 3/04; G01F 19/00; G21C 9/00

[52] U.S. Cl. .................................. 73/37; 73/426; 73/40; 376/294

[58] Field of Search ................................ 73/37, 426, 40, 73/41.2; 376/294

[56] References Cited

U.S. PATENT DOCUMENTS

| | | | |
|---|---|---|---|
| 3,911,735 | 10/1975 | Di Crispino | 73/102 |
| 4,577,487 | 3/1986 | Dooley | 73/37 |
| 4,653,331 | 3/1987 | Inouye et al. | 73/800 |
| 5,313,822 | 5/1994 | Bees et al. | 73/37 |
| 5,608,159 | 3/1997 | Carcone et al. | 73/49.8 |
| 5,675,122 | 10/1997 | Taylor | 174/50.58 |

*Primary Examiner*—Michael Brock
*Assistant Examiner*—Jay L. Politzer
*Attorney, Agent, or Firm*—Kenyon & Kenyon

[57] ABSTRACT

A pressure testing apparatus can pressure test separately a first object having a width and a height and a second object having a width and a height. The first object can be, for example, a fiber optic repeater; the second object can be, for example, a fiber optic branch unit. The pressure testing apparatus has a testing vessel and an adaptor. The testing vessel has a chamber with an inner width corresponding to the width of the first object and a first gap. The adaptor can be selectably insertable into the chamber of the testing vessel and has an inner width and an outer width. The outer width of the adaptor corresponds to the inner width of the chamber of the testing vessel and a second gap. The inner width of the adaptor corresponds to the width of the second object and a third gap.

6 Claims, 3 Drawing Sheets

PRESSURE VESSEL ADAPTOR FOR TESTING OF UNDERSEA FIBER OPTIC SYSTEMS

BACKGROUND OF THE INVENTION

The present invention generally is related to pressure testing. More specifically, the present invention is related to an apparatus and method for pressure testing fiber optic systems that are to be used in high pressure environments, such as undersea.

Pressure testing of a container is typically performed by pressurizing the inside of the container with, for example, a liquid such as water or a gas and then detecting any leaks outside the container. This type of testing replicates an environment where the inside of the container is at a higher pressure than the pressure of the environment where the container is typically located.

For example, U.S. Pat. No. 4,577,487 issued to Dooley, describes a pressure testing system where a container is immersed in water and then the inside of the container is pressurized. Acoustic events are recorded by sensors fixed either to the wall of the container or to the walls of the water-holding vessel. Acoustic event measurements indicate the position of the leak in the pressurized container.

Where a container is typically located in an environment having a higher pressure than the pressure inside the container, however, pressure testing can more effectively replicate the environment by pressurizing the outside of the container and detecting any leaks inside the container. For example, a container located in an undersea environment will be subject to substantially higher pressure than the pressure inside the container where the container was sealed at a typical atmospheric pressure.

Known systems for pressure testing at high pressures are typically dimensioned to correspond to the object to be tested. If the pressure testing system does not correspond to the dimensions of the object to be tested, an excessive amount of time (e.g., hours) can be required to obtain the high pressures needed to perform the pressure testing. Because various object sizes may need to be tested, difficulty exists in using a pressure testing system dimensioned for one object to test objects of other dimensions.

SUMMARY OF THE INVENTION

A pressure testing apparatus can pressure test separately a first object having a width and a height and a second object having a width and a height. The first object can be, for example, a fiber optic repeater; the second object can be, for example, a fiber optic branch unit. The pressure testing apparatus has a testing vessel and an adaptor. The testing vessel has a chamber with an inner width corresponding to the width of the first object and a first gap. The adaptor can be selectably insertable into the chamber of the testing vessel and has an inner width and an outer width. The outer width of the adaptor corresponds to the inner width of the chamber of the testing vessel and a second gap. The inner width of the adaptor corresponds to the width of the second object and a third gap.

In one embodiment, the chamber of the testing vessel has an inner height corresponding to the height of the first object and a first vertical gap; the adaptor has an inner height and an outer height. The outer height of the adaptor corresponds to the inner height of the chamber of the testing vessel and a second vertical gap. The inner height of the adaptor corresponds to the height of the second object and a third vertical gap.

In another embodiment, a measurement system separately is engagable with an interior of the first object and the second object while the first object and the second object is located within the chamber of said testing vessel. The chamber of the testing vessel is pressurizable while one object from the group of the first object and the second object is located within the chamber.

BRIEF DESCRIPTION OF THE DRAWINGS

The various features of the invention will be best appreciated by simultaneous reference to the description which follows and the accompanied drawings in which.

DETAILED DESCRIPTION

A pressure testing apparatus can pressure test separately two objects of different sizes. The first object can be, for example, a fiber optic repeater; the second object can be, for example, a fiber optic branch unit. An adaptor can be inserted selectably into the chamber of the testing vessel when the smaller object is to be tested in the pressure testing apparatus.

The volume within the chamber of the pressure testing apparatus that is to be filled with pressurized gas should be as small as possible to minimize the time required to pressurize the volume. In other words, because the amount of low-pressure gas required to pump a given volume to high pressure is proportional to that volume, the volume to be pressurized should be minimal. The amount of gas required to pump the volume effects the time needed to pump the volume to high pressure and thus effects the overall test time.

For example, to test the larger object, a nominal amount of time (i.e., approximately one hour) is necessary to pressurize the chamber of the pressure testing apparatus so that the pressure testing can be performed. The volume to be pressurized within the chamber of pressure testing apparatus is minimal because the chamber is designed to match the size of the larger object. To test the smaller object (without the adaptor being inserted within the chamber of the pressure testing apparatus), however, a substantially greater amount of time is necessary (i.e., approximately an additional eight hours) to pressurize the chamber of the pressure testing apparatus so that the pressure testing can be performed. Consequently, when the smaller object is be tested and the adaptor is inserted into the chamber of the pressure testing apparatus, the volume to be pressurized within the chamber is minimal and the time needed to pressurize the chamber of the pressure testing apparatus is reduced to approximately one hour.

Figure 1:
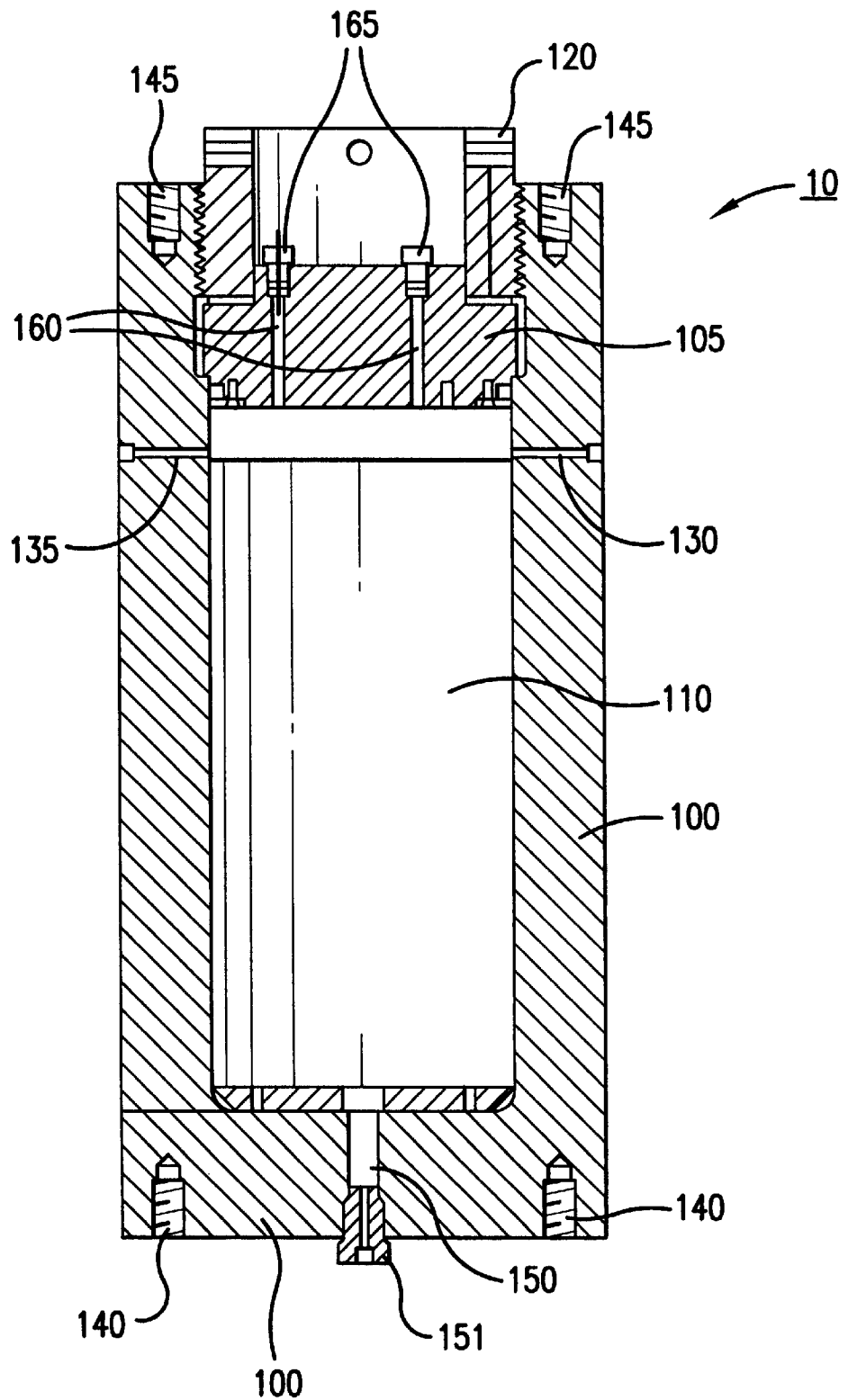
FIG. 1 illustrates a cross-sectional view of a pressure testing vessel according to an embodiment of the present invention.

FIG. 1 illustrates a pressure testing vessel, according to an embodiment of the present invention. Pressure testing vessel 10 includes outer walls 100 and lid 105 that define chamber 110. Lid 105 is removably engagable with outer walls 110 and can be held in place by retaining ring 120. Retaining ring 120 can be rotatably engaged with outer walls 110 due to the threading cooperating between retaining ring 120 and outer walls 110. In one embodiment, chamber 110 has a diameter of approximately 20" and a height of approximately 46". In this embodiment, the pressure testing vessel 10 has an overall diameter 32" and an overall height of 72.5". The thickness of outer walls 100 is approximately 6".

Outer walls 100, lid 105 and retaining ring 120 can be made from high-strength, tempered alloy steel which allow very high pressures within chamber 110 up to, for example, 12,000 psi at ambient temperatures. These types of pressures replicate the pressure possible in an undersea environment where a fiber optic repeater and/or branching unit can be located within, for example, a transoceanic fiber optic telecommunication system.

Outer walls 110 also include a gas entry port 130 and relief valve 135. Gas entry port 130 allows gas to enter chamber 110 thereby allowing pressure testing of an object within chamber 110. Relief valve 135 can be a ruptured disk type mechanical fuse that allows gas to be released when necessary. The gas used in the pressure testing can be, for example, helium nitrogen (HeN). A measurement system, such as a helium detector can be placed within the object being pressure tested so that when the object has a leak, the helium nitrogen gas enters the object and can be detected by the helium detector.

Note that the inner diameter of the outer walls 100 can correspond to the outer diameter of an object being pressure tested and a first gap. This first gap equals the difference between the inner diameter of outer walls 100 and the outer diameter of the object being pressure tested. In other words, the inner diameter of the outer walls 100 is typically selected to substantially equal the outer diameter of one object to be pressure tested where the object can be inserted into chamber 110 with a machine fit. For example, the first gap can be of a size on the order of mils.

Outer walls 100 include mounting fixtures 140 which allow the pressure testing vessel to be mounted on to, for example, a concrete pedestal thereby maintaining the position of the pressure testing vessel. Outer walls 100 can also include tooling holes 145 at the top of outer walls 100. Tooling holes 145 allow the placement of the object being tested (e.g., a fiber optic repeater and/or a branching unit system) within chamber 110 of pressure testing vessel 10.

Pressure testing vessel 10 also can include a drain 150 and plug 151 in the floor of outer walls 100. Drain 150 and plug 151 allow liquid such as water to drain from chamber 110 when pressure testing vessel 10 itself is, for example, hydrostatic pressure tested to validate the integrity of pressure testing vessel 10. Note that once pressure testing vessel 10 itself has been pressure tested to validate its integrity, drain 150 need not be used for the pressure testing of an object (e.g., a fiber optic repeater and/or a branching unit system) within chamber 110 of pressure testing vessel 10.

Lid 105 can include tubes 160 and caps 165. Tubes 160 allow access to chamber 110 through which the helium detector can access objects within chamber 110 while pressure testing is performed. Other types of devices and/or cabling, such as fiber optic cables, can access objects within chamber 110 through tubes 160 while pressure testing is performed. Such objects can include fiber optic systems like a repeater system or a branching unit system.

Figure 2:
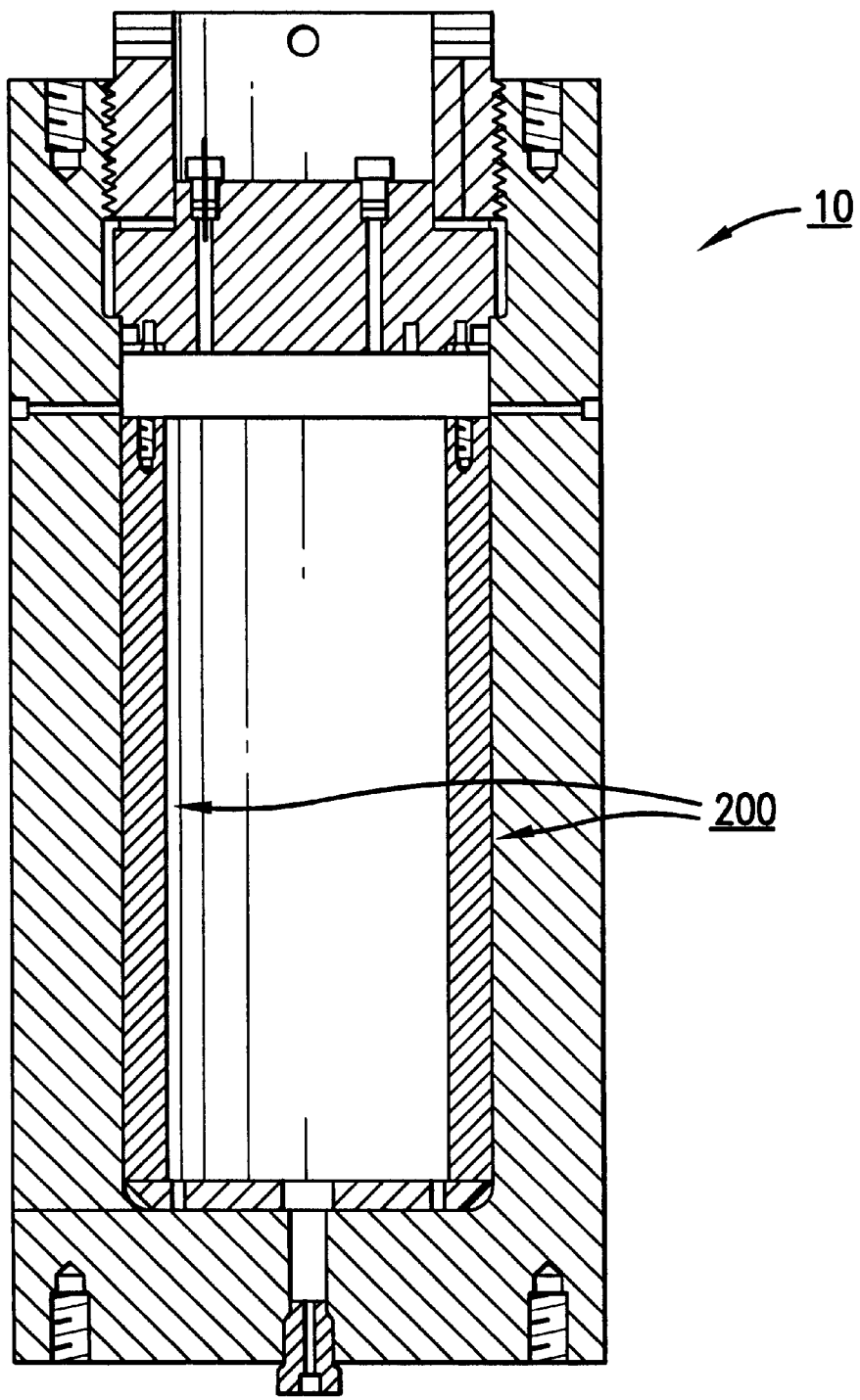
FIG. 2 illustrates a cross-sectional view of an adaptor disposed within the chamber of the pressure testing vessel shown in FIG. 1, according to an embodiment of the present invention.

FIG. 2 illustrates an adaptor disposed within the chamber of a pressure test vessel, according to an embodiment of the present invention. The pressure test vessel 10 shown in FIG. 2 corresponds to the pressure test vessel 10 shown in FIG. 1.

Adaptor 200 can have an annulus shape and can be, for example, integrally formed. Adaptor 200 can be made of, for example, high strength, tempered alloy steel just as outer walls 100 of pressure testing vessel 10.

Adaptor 200 can have an outer diameter corresponding to the diameter of a first object (e.g., a fiber optic branching unit system) and a second gap. The second gap equals the difference between the first object diameter and the wall outer diameter. Adaptor 200 can have an inner diameter corresponding to the diameter of a second object (e.g., a fiber optic repeater system) and a third gap. The third gap equals the difference between the wall inner diameter and the second object diameter. The second gap and the third gap can be very small, for example, a size corresponding to a machine fit between the associated surfaces. For example, the second gap and the third gap can be of a size on the order of mils.

Adaptor 200 can be used to allow pressure testing of two different sized objects: the larger object can be inserted into chamber 110 without adaptor 200 being inserted within chamber 110, or the smaller object can be inserted into chamber 110 with adaptor 200 being inserted within chamber 110. The same pressure testing vessel 10 to be used to test, for example, both a fiber optic repeater system and a fiber optic branching unit system.

The appropriate cabling, such as for example the helium detector cabling, can then be inserted into one of the tubing 160 through cap 165. Alternatively, fiber optic cabling can be inserted into one of the tubing 160 through cap 165. For example, when a fiber optic repeater system is to be tested using pressure testing vessel 10, adaptor 200 can be slidably inserted into chamber 110 and the repeater unit can be slidably inserted into the inside of adaptor 200; one set of tubing 160 and cap 165 can be used for the appropriate cabling. Similarly, when a fiber optic branching unit system is to be tested using the same pressure testing vessel 10, the branching unit system can be slidably inserted into chamber 110; the other set of tubing 160 and cap 165 can be used for the appropriate cabling.

By inserting adaptor 200 into chamber 110 of pressure testing vessel, one object (e.g., a fiber optic repeater system) can be pressure tested without unnecessarily waiting for the excess volume in chamber 110 to pressurize. As a result, several hours can be saved when pressurizing chamber 110 for the object while also allowing pressure testing vessel 10 to be used for a second object (e.g., a fiber optic branching unit system) with adaptor 200 removed. Note that as chamber 110 is pressurized when adaptor 200 and the second object are inserted within chamber 110, both the gas within the gap between the adaptor outer wall and the chamber inner wall and the gas within the gap between the adaptor inner wall and the second object are pressurized.

Figure 3:
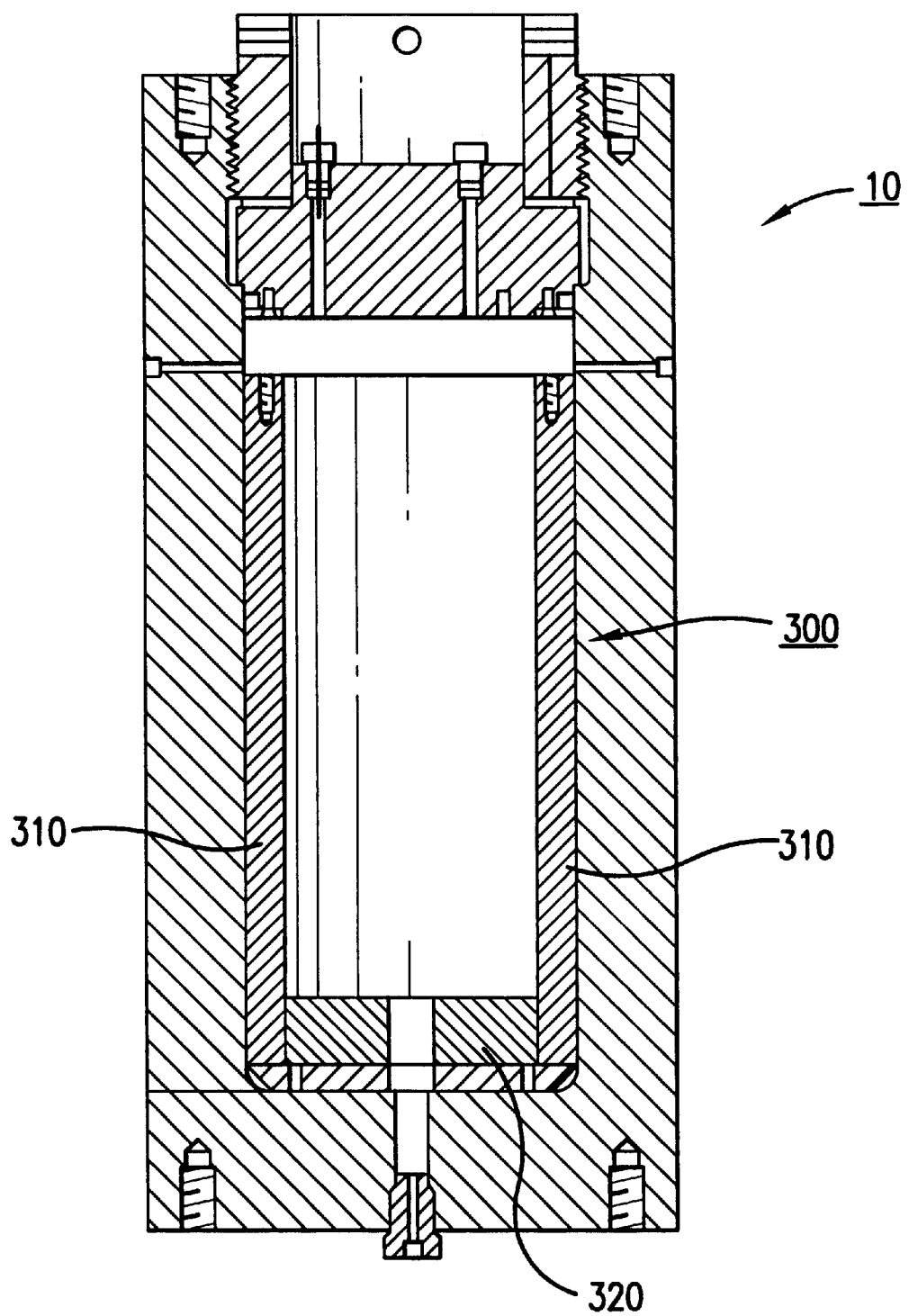
FIG. 3 illustrates a cross-sectional view of an adaptor disposed within the chamber of a pressure testing vessel shown in FIG. 1, according to another embodiment of the present invention.

FIG. 3 illustrates an adaptor disposed within the chamber of a pressure test vessel, according to another embodiment of the present invention. The pressure test vessel 10 shown in FIG. 3 corresponds to the pressure test vessel shown in FIG. 1.

Adaptor 300 includes walls 310 and base 320. Wall 310 and base 320 of adaptor 300 can be, for example, integrally formed. Wall 310 and base 320 of adaptor 200 can be made of, for example, high strength, tempered alloy steel just as outer walls 100 of pressure testing vessel 10.

Wall 310 of adaptor 300 can have an outer diameter corresponding to the diameter of a first object and a second gap. The second gap equals the difference between the first object diameter and the wall outer diameter. Wall 310 can have an inner diameter corresponding to the diameter of a second object and a third gap. The third gap equals the difference between the wall inner diameter and the second object diameter. The second gap and the third gap can be very small, for example, a size corresponding to a machine fit between the associated surfaces. For example, the second gap and the third gap can be of a size on the order of mils.

Similarly, base 320 of adaptor 300 has a thickness so that adaptor 300 has an outer height corresponding to the height of the first object and a first vertical gap. The first vertical gap equals the difference between the adaptor outer height and the first object height. Base 320 can have an inner height corresponding to the second object and a second vertical gap. The second vertical gap equals the difference between the base inner height and the second object height. Similar to the first and second horizontal gaps, the first vertical gap and the second vertical gap can be very small, for example, a size corresponding to a machine fit between the associated surfaces. For example, the first vertical gap and the second vertical gap can be of a size on the order of mils.

It should, of course, be understood that while the present invention has been described in reference to particular configurations, other configurations should be apparent to those of ordinary skill in the art. For example, although the pressure testing vessel and the adaptor is described in reference to specific dimensions for specific underwater fiber optic repeaters and branching units, the pressure testing vessel and the adaptor can be of any dimension appropriate for the dimension of the repeaters and/or branching units.

What is claimed is:

1. An apparatus for pressure testing separately a first object having a width and a height and a second object having a width and a height, comprising:
    a testing vessel having a chamber with an inner width corresponding to the width of the first object and a first gap, the first gap being the difference between the chamber inner width and the first object width; and
    an adaptor being selectably insertable into the chamber of said testing vessel, the adaptor having an inner width and an outer width,
    the outer width of said adaptor corresponding to the inner width of the chamber of said testing vessel and a second gap, the second gap being the difference between the chamber inner width and the adaptor outer width,
    the inner width of said adaptor corresponding to the width of the second object and a third gap, the third gap being the difference between the adaptor inner width and the second object width;
    the chamber of said testing vessel has an inner height corresponding to the height of the first object and a first vertical gap, the first vertical gap being the difference between the first object height and the chamber inner height,
    said adaptor having an inner height and an outer height,
    the outer height of said adaptor corresponding to the inner height of the chamber of said testing vessel and a second vertical gap, the second vertical gap being the difference between the chamber inner height and the adaptor outer height,
    the inner height of said adaptor corresponding to the height of the second object and a third vertical gap, the third vertical gap being the difference between the adaptor inner height and the second object height.

2. The apparatus of claim 1 wherein the first vertical gap is substantially equal to the third vertical gap.

3. An apparatus for pressure testing separately a first object having a width and a height and a second object having a width and a height, comprising:
    a testing vessel having a chamber with an inner width corresponding to the width of the first object and a first gap, the first gap being the difference between the chamber inner width and the first object width; and
    an adaptor being selectably insertable into the chamber of said testing vessel, the adaptor having an inner width and an outer width,
    the outer width of said adaptor corresponding to the inner width of the chamber of said testing vessel and a second gap, the second gap being the difference between the chamber inner width and the adaptor outer width,
    the inner width of said adaptor corresponding to the width of the second object and a third gap, the third gap being the difference between the adaptor inner width and the second object width;
    the first object is a fiber optic repeater and the second object is a fiber optic branch unit.

4. In a testing vessel for pressure testing separately a first object having a width and a second object having a width, the testing vessel having a chamber with an inner width corresponding to the width of the first object and a first gap, the first gap being the difference between the chamber inner width and the first object width, an adaptor comprising:
    a wall having an inner width and an outer width, the inner width of said wall corresponding to the width of the second object and a second gap, the second gap being the difference between the inner wall width and the second object width, the outer width of said wall corresponding to the width of the first object and a third gap, the third gap being the difference between the first object width and the wall outer width;
    a base connected to said wall;
    said wall and said base being selectable insertable into the chamber of said testing vessel;
    said wall and said base have an inner height and an outer height,
    the outer height of said wall and said base corresponding to an inner height of the chamber of the testing vessel and a first vertical gap, the first vertical gap being the difference between the wall outer height plus the base height and the chamber inner height,
    the outer height of said wall and said base corresponding to a height of the first object, and a second vertical gap, the second vertical gap being the difference between the wall outer height plus the base height and the first object height,
    the inner height of said wall and said base corresponding to a height of the second object and a third vertical gap, the third vertical gap being the difference between the wall inner height plus the base inner height and the second object height.

5. The adaptor of claim 4 wherein the first vertical gap is substantially equal to the third vertical gap.

6. In a testing vessel for pressure testing separately a first object having a width and a second object having a width, the testing vessel having a chamber with an inner width corresponding to the width of the first object and a first gap, the first gap being the difference between the chamber inner width and the first object width, an adaptor comprising:
    a wall having an inner width and an outer width, the inner width of said wall corresponding to the width of the second object and a second gap, the second gap being the difference between the inner wall width and the second object width, the outer width of said wall corresponding to the width of the first object and a third gap, the third gap being the difference between the first object width and the wall outer width;

a base connected to said wall;

said wall and said base being selectably insertable into the chamber of said testing vessel;

the inner width of said wall corresponding to the width of the second object and the second gap, the second object being a fiber optic repeater, the outer width of said wall corresponding to the width of the first object and the first gap, the first object being a fiber optic branching unit.

\* \* \* \* \*